(12) United States Patent
Kobayashi et al.

(10) Patent No.: US 12,449,321 B2
(45) Date of Patent: Oct. 21, 2025

(54) METAL MEMBER WITH INSULATING FILM, PHYSICAL QUANTITY SENSOR, AND PRESSURE SENSOR

(71) Applicant: TDK CORPORATION, Tokyo (JP)

(72) Inventors: Masanori Kobayashi, Tokyo (JP); Ken Unno, Tokyo (JP); Tetsuya Sasahara, Tokyo (JP); Kohei Nawaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 323 days.

(21) Appl. No.: 18/167,586

(22) Filed: Feb. 10, 2023

(65) Prior Publication Data
US 2023/0273083 A1 Aug. 31, 2023

(30) Foreign Application Priority Data
Feb. 25, 2022 (JP) .................. 2022-028576

(51) Int. Cl.
*G01L 7/08* (2006.01)
*G01L 19/00* (2006.01)

(52) U.S. Cl.
CPC .......... *G01L 7/082* (2013.01); *G01L 19/0084* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00;
(Continued)

(56) References Cited

U.S. PATENT DOCUMENTS

| | | |
|---|---|---|
| 2008/0060441 A1 | 3/2008 | Toyoda |
| 2023/0131075 A1 | 4/2023 | Kobayashi et al. |

(Continued)

FOREIGN PATENT DOCUMENTS

| | | | |
|---|---|---|---|
| EP | 3 940 359 A1 | 1/2022 | |
| EP | 3939783 A1 * | 1/2022 | ............. B29C 43/56 |

(Continued)

OTHER PUBLICATIONS

Dec. 5, 2024 Office Action issued in European Patent Application No. 23156868.4.
(Continued)

*Primary Examiner* — Andre J Allen
(74) *Attorney, Agent, or Firm* — Oliff PLC (57) ABSTRACT

A metal member with insulating film includes a metal member, an insulating film, and a reinforcement portion. The metal member includes a film formation surface and a connection surface facing in a different direction from the film formation surface and connecting to the film formation surface. The insulating film covers at least a part of the film formation surface and the connection surface over a connection position between the film formation surface and the connection surface. The reinforcement portion is formed along a periphery of the insulating film at the connection position and covers at least a part of the periphery of the insulating film from an opposite side to the metal member.

8 Claims, 7 Drawing Sheets

(58) Field of Classification Search
CPC ......... G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 5/0033; G01L 5/102; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106

USPC .................................................. 73/700–756

See application file for complete search history.

(56) References Cited

U.S. PATENT DOCUMENTS

2024/0068891 A1\* 2/2024 Kobayashi ............ G01L 9/0055
2024/0068897 A1\* 2/2024 Kobayashi .......... G01L 19/0069
2024/0117474 A1\* 4/2024 Nawaoka ............ C23C 14/3464

FOREIGN PATENT DOCUMENTS

JP        H0513782 A    *  1/1993
JP        2016099302 A  *  5/2016
JP        2018-091848 A    6/2018
WO        2021/166853 A1   8/2021

OTHER PUBLICATIONS

Jul. 13, 2023 Extended Search Report issued in European Patent Application No. 23156868.4.

\* cited by examiner

METAL MEMBER WITH INSULATING FILM, PHYSICAL QUANTITY SENSOR, AND PRESSURE SENSOR

BACKGROUND OF THE INVENTION

The present invention relates to a metal member with insulating film and a physical quantity sensor and a pressure sensor including the metal member.

A pressure sensor or a physical quantity sensor may employ an insulating-film-attached metal member in which an insulating film is formed on a metal member. In the insulating-film-attached metal member, the insulating film is formed using excellent characteristics of metal members, such as mechanical characteristics like elasticity and durability at high temperature, and it is thereby possible to add an electrical element of a detection circuit with a strain resistance film to the conductive metal member in an insulated manner.

However, mechanical properties, such as linear expansion coefficient and Young's modulus, of the insulating film, are significantly different from those of the metal member, and the mechanical strength of the insulating film tends to be inferior to that of the metal member. Thus, there is a problem that the insulating film is easily peeled off or damaged. In addition, the insulating film tends to peel off from the outer edge, and it is thus conceivable that the insulating film is widely formed on the metal member so as to cover a film formation surface for forming a detection circuit or the like and also cover a connection surface such as a side surface connecting to the film formation surface.

Patent Document 1: JP2018091848 (A)

BRIEF SUMMARY OF THE INVENTION

However, damage, such as cracking, tends to easily occur at a periphery of the insulating film, where the surface orientation of the insulating film changes along the surface orientation of the metal member. Thus, cracking and peeling may progress from the periphery of the insulating film to the insulating film on the film formation surface, and the insulating film may have a performance degradation in terms of insulation or shielding against liquids and gases.

The present disclosure provides a metal member with insulating film, and the like, capable of preventing generation of cracking and peeling at a periphery of an insulating film.

A metal member with insulating film according to the present disclosure comprises:
a metal member including:
  a film formation surface; and
  a connection surface facing in a different direction from the film formation surface and connecting to the film formation surface;
an insulating film covering at least a part of the film formation surface and the connection surface over a connection position between the film formation surface and the connection surface; and
a reinforcement portion formed along a periphery of the insulating film at the connection position and covering at least a part of the periphery of the insulating film from an opposite side to the metal member.

The metal member with insulating film includes the reinforcement portion formed along the periphery of the insulating film and can thus effectively prevent generation of cracking and peeling at the periphery of the insulating film and prevent a performance degradation of the insulating film.

For example, the reinforcement portion may comprise a metal thin film.

The metal thin film has a moderate strength and conformability to the insulating film and favorably functions as the reinforcement portion for the periphery of the insulating film.

For example, the metal thin film may comprise an Au layer containing Au.

The Au layer has a favorable ductility and is less likely to have cracking and thus favorably functions as the reinforcement portion for the periphery of the insulating film. Moreover, the Au layer tends to have a small stress with chemical stability and excellent weather resistance and is less likely to have a peeling due to stress.

For example, the metal thin film may comprise a Pt layer containing Pt.

The Pt layer exhibits an excellent thermal stability and thus favorably functions as the reinforcement portion for the periphery of the insulating film, particularly in a high temperature environment.

For example, the metal thin film comprises an adhesive layer contacted with the insulating layer and at least one other layer, wherein the adhesive layer has an adhesion to the insulating layer being higher than that of the at least one other layer.

The metal thin film including the adhesive layer has a high adhesion to the insulating film. Thus, it is possible to effectively reinforce the periphery of the insulating film and favorably prevent generation of cracking and peeling from the periphery of the insulating film.

A physical quantity sensor according to the first aspect of the present disclosure comprises:
  the above-mentioned metal member with insulating film;
  a detection unit detecting a physical quantity of the metal member, the detection unit being formed on an upper side of the film formation surface, the upper side being the opposite side of the insulating layer to a surface thereof facing the film formation surface; and
  an electrode film formed so as to overlap with a part of the detection unit from above and connected with a wiring unit for ensuring electrical conduction to the outside of the detection unit,
  wherein the metal thin film of the reinforcement portion comprises a common layer with at least a part of layers of the electrode film.

The physical quantity sensor including the reinforcement portion prevents a performance degradation of the insulating film and has a favorable durability. Moreover, at least a part of the reinforcement portion can be formed simultaneously in the formation process of layers contained in the electrode film, and the physical quantity sensor is thus excellent in productivity A physical quantity sensor according to the second aspect of the present disclosure comprises:
  the above-mentioned metal member with insulating film; and
  a detection unit detecting a physical quantity of the metal member, the detection unit being formed on an upper side of the film formation surface, the upper side being the opposite side of the insulating layer to a surface thereof facing the film formation surface, wherein
    the metal member comprises a stem shape including a membrane with the film formation surface and a side wall portion with the connection surface, and
    the detection unit detects a deformation amount of the membrane.

The physical quantity sensor including the reinforcement portion favorably prevents damage and performance degradation of the insulating film formed on the metal member having the stem shape and has a favorable durability.

A pressure sensor according to the present disclosure comprises:
    the above-mentioned metal member with insulating film; and
    a detection unit detecting a physical quantity of the metal member, the detection unit being formed on an upper side of the film formation surface, the upper side being the opposite side of the insulating layer to a surface thereof facing the film formation surface,
    wherein
    the metal member comprises a stem shape including a membrane with the film formation surface and a side wall portion with the connection surface, and
    the detection unit detects a deformation amount of the membrane due to pressure.

The pressure sensor including the reinforcement portion favorably prevents damage and performance degradation of the insulating film formed on the metal member having the stem shape and has a favorable durability. Moreover, the pressure sensor is excellent in durability of the insulating film and can thus particularly favorably be used as a pressure sensor in a high temperature and high pressure environment.

DETAILED DESCRIPTION OF THE INVENTION

Hereinafter, the present invention is described based on embodiments shown in the figures.

First Embodiment

Figure 1:
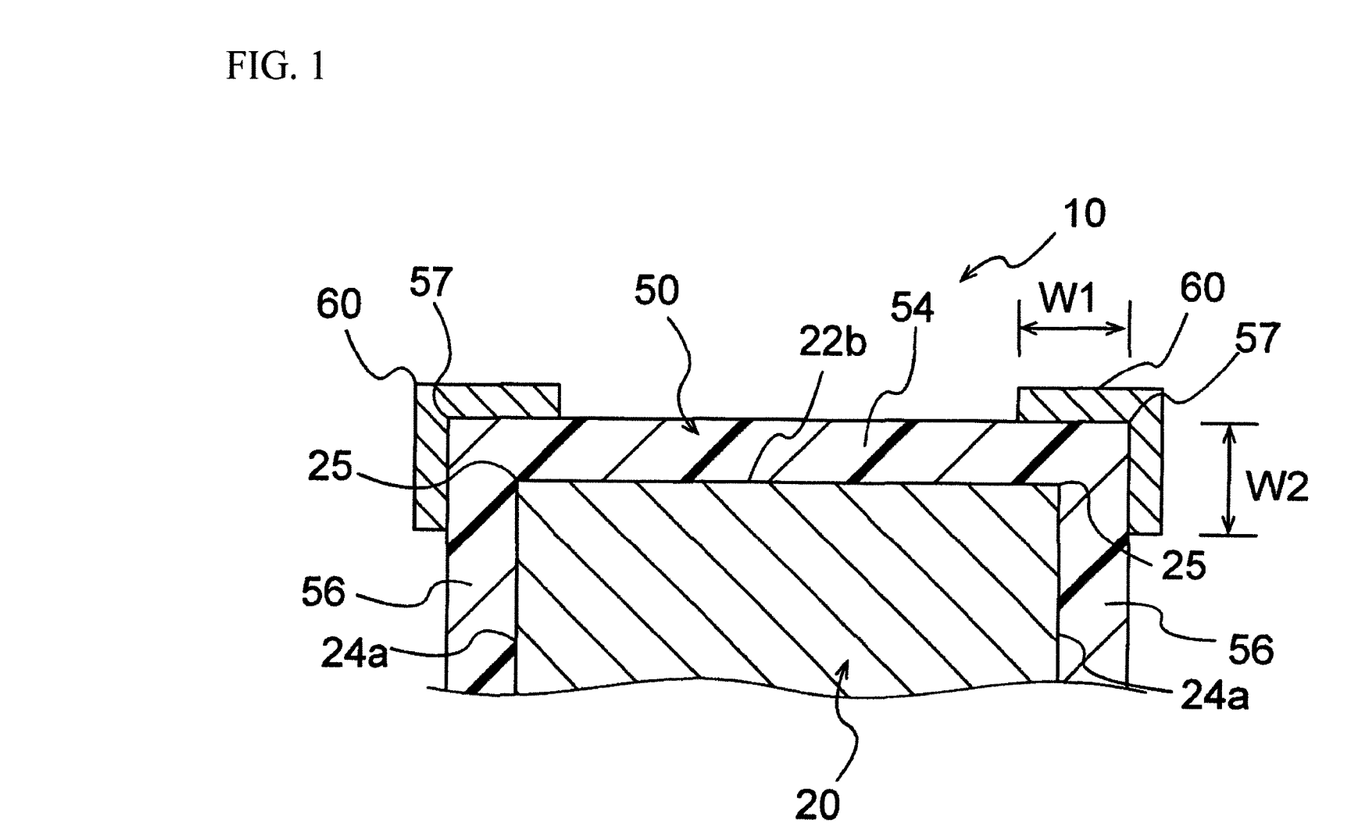
FIG. 1 is a schematic cross-sectional view of an insulating-film-attached metal member according to First Embodiment.
Figure 2A:
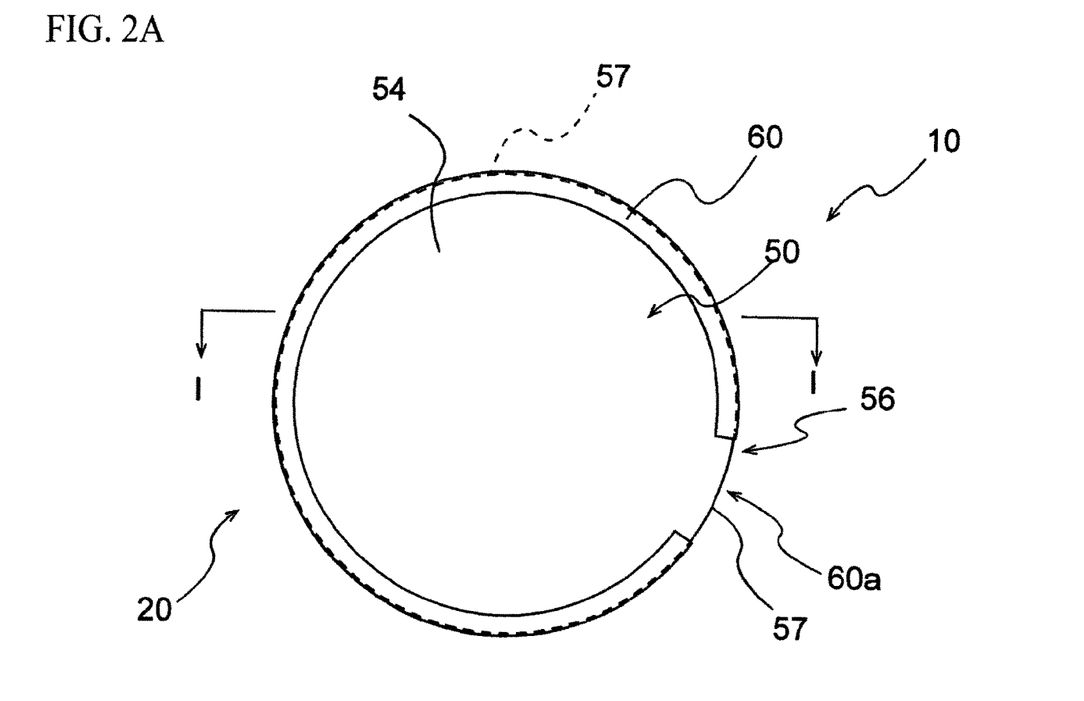
FIG. 2A and FIG. 2B are top views of the insulating-film-attached metal member shown in FIG. 1 and an insulating-film-attached metal member according to a modification.
Figure 2B:
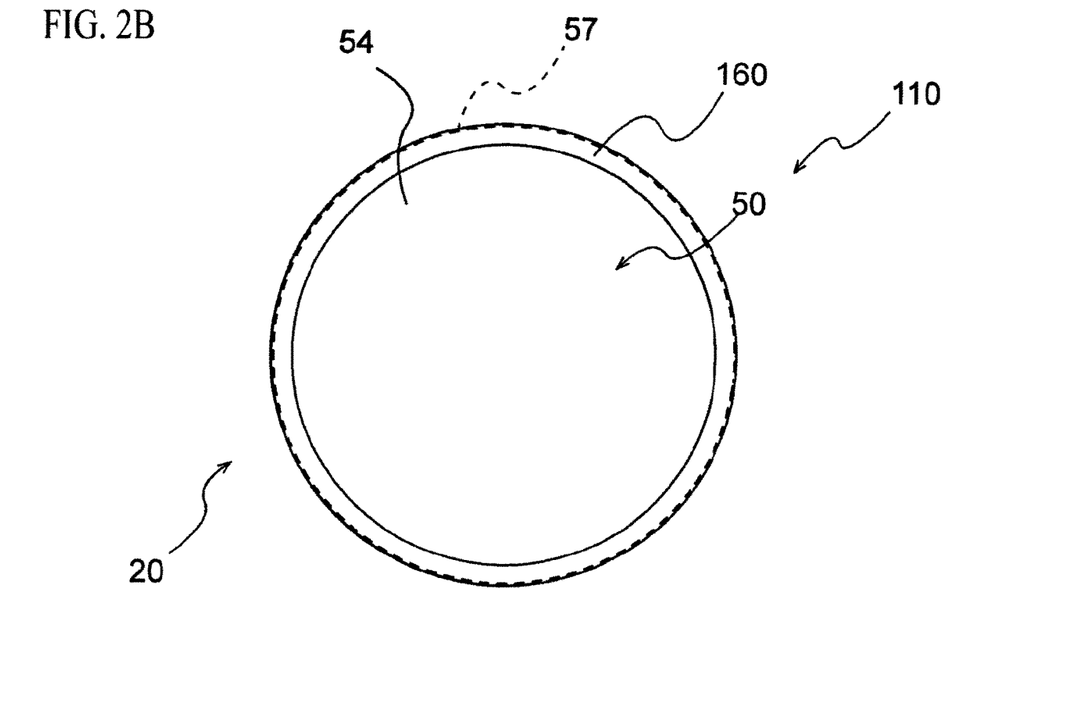

FIG. 1 is a schematic cross-sectional view of an insulating-film-attached metal member 10 according to First Embodiment, and FIG. 2A and FIG. 2B are top views of the insulating-film-attached metal member 10 viewed from its upper surface. In each figure, for the convenience of description of each part included in the insulating-film-attached metal member 10, the dimensions of each part are illustrated in different proportions from the actual ones.

As shown in FIG. 1, the insulating-film-attached metal member 10 includes a metal member 20, an insulating film 50, and a reinforcement portion 60. The metal member 20 shown in FIG. 1 has a substantially columnar shape, but the shape of the metal member 20 used for the insulating-film-attached metal member 10 is not limited to columnar and may be polygonal prism, such as rectangular parallelepiped, cylindrical, polygonal polyhedron, or the like.

The metal member 20 may be made of any single metal or alloy, such as steel, aluminum alloy, stainless steel, and nickel alloy. Preferably, from the point of enhancement in durability, the material of the metal member 20 is one material selected from SUS304 and SUS316, which are austenitic stainless steel, and SUS630 and SUS631, which are precipitation austenite.

As shown in FIG. 1, the metal member 20 includes a film formation surface 22b and a connection surface 24a. The film formation surface 22b of the metal member 20 is one of the bottom surfaces of the cylinder, and the connection surface 24a is a side surface of the cylinder. However, the shapes of the film formation surface 22b and the connection surface 24a are not limited to those shown in FIG. 1, and any surface (film formation surface) and another any surface (connection surface) facing in a different direction from the surface and connecting to the surface can be the film formation surface 22b and the connection surface 24a, respectively.

The film formation surface 22b is entirely covered with an insulating film 50. The film formation surface 22b is directly covered with the insulating film 50 and is contacted with a lower surface of the insulating film 50. However, a part (e.g., 20% or less of the entire area) of the film formation surface 22b may be exposed from the insulating film 50. The film formation surface 22b shown in FIG. 1 is flat, but the film formation surface 22b may be curved.

As shown in FIG. 1, the film formation surface 22b faces upward, and the connection surface 24a faces sideways (horizontal direction) and faces in a different direction from the film formation surface 22b. The connection surface 24a is connected to the film formation surface 22b, and the surface orientation of the metal member 20 changes at a connection position 25 between the connection surface 24a and the film formation surface 22b. The surface orientations of the film formation surface 22b and the connection surface 24a are defined, for example, by a normal direction of each surface. The film formation surface 22b and the connection surface 24a face in directions different from each other by approximately 90 degrees, but the relation between the film formation surface 22b and the connection surface 24a is not limited to the case where they face in directions different from each other by 90 degrees.

At least a part of the connection surface 24a is covered with the insulating film 50. In particular, since the connection surface 24a is a surface connected to the film formation surface 22b, the portion of the connection surface 24a near the connection position 25 is directly covered with the insulating film 50 continuing from the film formation surface 22b. As with the film formation surface 22b, the connection surface 24a is also contacted with the insulating film 50.

As with the film formation surface 22b, although the connection surface 24a may be entirely or mostly covered with the insulating film 50, unlike the film formation surface 22b, only a part (the vicinity of the connection position 25) may be covered with the insulating film 50, and the rest may be exposed from the insulating film 50. The boundary between the portion covered with the insulating film 50 and the portion exposed from the insulating film 50 on the connection surface 24a may be transitional as the film thickness of the insulating film 50 decreases.

As shown in FIG. 1, the insulating film 50 covers at least a part of the film formation surface 22b and the connection surface 24a over the connection position 25 between the film formation surface 22b and the connection surface 24a. The insulating film 50 is composed of, for example, silicon oxide such as $SiO_2$, silicon nitride such as $Si_3N_4$, silicon oxynitride such as SiON, or other ceramics such as $AlO_3$, but the material of the insulating film 50 is not limited as long as it is an insulating film.

The insulating film 50 is formed on the film formation surface 22b and the connection surface 24a of the metal member 20 by a thin film formation method, such as CVD, sputtering, and vapor deposition, but the method of forming the insulating film 50 is not limited. The film thickness of the insulating film 50 on the film formation surface 22b can be about 0.1 to 10 μm and is preferably 1 to 5 μm.

As shown in FIG. 1, since the insulating film 50 is formed over the connection position 25 between the film formation surface 22b and the connection surface 24a, an insulating-film periphery 57 is formed in a portion of the insulating film 50 covering the connection position 25. In the insulating-film periphery 57 of the insulating film 50 covering the connection position 25, the extension direction of the insulating film 50 changes following the change in the surface orientation of the connection position 25 of the metal member 20, and the insulating film 50 forms a periphery.

As shown in FIG. 2A, the insulating-film periphery 57 is formed corresponding to the outer edge of the film formation surface 22b, that is, the connection position 25. The insulating-film periphery 57 of the insulating-film-attached metal member 10 has a circular shape. As shown in FIG. 1, a portion inside the insulating-film periphery 57 on the insulating film 50 covers the film formation surface 22b of the metal member 20, and this portion is an insulating film first portion 54. Preferably, from the point of securing the function of the insulating film 50 on the film forming surface 22b, the insulating film 50 has a substantially constant film thickness in the insulating film first portion 54.

A portion outside the insulating-film periphery 57 on the insulating film 50 covers the connection surface 24a of the metal member 20, and this portion is an insulating film second portion 56. The insulating film second portion 56 may be as thick as the insulating film first portion 54 or may be thinner than the insulating film first portion 54.

As shown in FIG. 1, the reinforcement portion 60 covers at least a part of the insulating-film periphery 57 from the opposite side to the metal member 20. That is, the reinforcement portion 60 is formed on the insulating-film periphery 57 and the insulating film 50 in its vicinity and directly covers the insulating-film periphery 57.

As shown in FIG. 2A, the reinforcement portion 60 is formed in a ring shape along the insulating-film periphery 57. The reinforcement portion 60 is formed continuously along the insulating-film periphery 57, but does not cover the whole of the insulating-film periphery 57 and includes a discontinuous portion 60a for exposing a part of the insulating-film periphery 57.

That is, as shown in FIG. 2A, the reinforcement portion 60 of the insulating-film-attached metal member 10 has a substantially C-ring shape with the discontinuous portion 60a. However, the shape of the reinforcement portion 60 is not limited to the shape shown in FIG. 2A.

FIG. 2B is a top view illustrating an insulating-film-attached metal member 110 according to First Modification. As shown in FIG. 2B, a reinforcement portion 160 of the insulating-film-attached metal member 110 has a ring shape continuing along the insulating-film periphery 57 so as to cover the whole of the insulating-film periphery 57. In addition to the shapes shown in FIG. 2A and FIG. 2B, for example, the reinforcement portion includes a shape intermittently formed along the insulating-film periphery 57 and having a plurality of discontinuous portions.

The reinforcement portion 60 shown in FIG. 1 and FIG. 2 is made of a film formed on the insulating film 50 and is preferably made of a metal thin film from the point of the ductility and strength required for the reinforcement portion 60. The metals constituting a metal thin film are not limited and include Au, Al, Ru, Rh, Pd, Os, Ir, Pt, Cr, Ti, Ni, Mo, etc. The reinforcement portion 60 made of a metal thin film may be made of a single layer as shown in FIG. 1 or may be made of a plurality of layers as shown in Second to Fourth Embodiments mentioned below. A film other than the metal thin film constituting the reinforcement portion 60 is, for example, an insulating film of a silicon oxide.

The metal thin film constituting the reinforcement portion 60 is formed on the insulating film 50 by a thin film formation method, such as sputtering and vapor deposition. The shape of the thin metal film constituting the reinforcement portion 60 can be formed into any shape along the insulating-film periphery 57 using photolithography or metal mask.

In particular, when the reinforcement portion 60 is made of a metal thin film, the reinforcement portion 60 shown in FIG. 1 preferably has a thickness of approximately 50 to 500 nm and more preferably has a thickness of 100 to 200 nm. If the thickness of the reinforcement portion 60 is smaller than a predetermined value, it is difficult for the reinforcement portion 60 to form a continuous film, and the protection function of the reinforcement portion 60 for the insulating-film periphery 57 is lowered. On the other hand, if the thickness of the reinforcement portion 60 is larger than a predetermined value, there are disadvantages, such as a decrease in throughput due to an increase in film formation time and an increase in raw material costs.

As shown in FIG. 2A, the reinforcement portion 60 may include the discontinuous portion 60a for exposing a part of the insulating-film periphery 57, but from the point of preventing the damage of the insulating film 50 generated from the insulating-film periphery 57, the reinforcement portion 60 preferably covers 80% or more of the insulating-film periphery 57.

As shown in FIG. 2A, the reinforcement portion 60 is formed in a strip manner along the insulating-film periphery 57. As shown in FIG. 1, the reinforcement portion 60 has a predetermined width from the insulating-film periphery 57 to the insulating film first portion 54 side and from the insulating-film periphery 57 to the second insulating film portion 56 side.

As shown in FIG. 1, for example, a first width W1 from the insulating-film periphery 57 to the end of the reinforcement portion 60 on the insulating film first portion 54 side is preferably 50 to 350 μm and is more preferably 100 to 250 μm. When the first width W1 is a predetermined value or more, the insulating-film periphery 57 can be reliably covered and protected. When the first width W1 is a predetermined value or less, a region exposed from the reinforcement portion 60 can be formed widely in a central part of the insulating film first portion 54. As a result, a region for disposing another structure, such as a detection unit 430 (see FIG. 6) mentioned below, can be formed on the insulating film first portion 54 using the metal member 20 with a limited size.

Preferably, a second width W2 from the insulating-film periphery 57 to the end of the reinforcement portion 60 on the insulating film second portion 56 side is, for example, 50 µm or more. When the second width W2 is a predetermined value or more, the insulating-film periphery 57 can be reliably covered and protected. The portion of the reinforcement portion 60 from the insulating-film periphery 57 to the insulating film second portion 56 side may have a thickness different from that of the portion of the reinforcement portion 60 from the insulating-film periphery 57 to the end on the insulating film first portion 54 side. For example, the maximum thickness of the portion of the reinforcement portion 60 from the insulating-film periphery 57 to the insulating film second portion 56 side can be 10 to 110%, preferably 70 to 100%, of the portion of the reinforcement portion 60 from the insulating-film periphery 57 to the end on the insulating film first portion 54 side.

In the insulating-film-attached metal member 10 including the insulating film 50 and the reinforcement portion 60 as described above, the insulating film 50 reliably protects the film formation surface 22b, and it is possible to effectively prevent the occurrence of cracking and peeling of the insulating film first portion 54 on the film formation surface 22b. Since the insulating film 50 continuously covers the metal member 20 from the film formation surface 22b to the connection surface 24a, even if cracking or peeling occurs at the outer edge of the insulating film 50, it is possible to prevent for the cracking or peeling to travel to the film formation surface 22b.

If the metal member 20 from the film formation surface 22b to the connection surface 24a is merely covered with an insulating film, cracking or peeling may be likely to occur at the insulating-film periphery 57 covering the connection position 25 between the film formation surface 22b and the connection surface 24a. Since the insulating-film-attached metal member 10 is provided with the reinforcement portion 60 formed along the insulating-film periphery 57 covering the connection position 25, however, the reinforcement portion 60 reinforces the insulating-film periphery 57, and it is possible to effectively prevent the problem of cracking and peeling occurring at the insulating-film periphery 57.

Second Embodiment

Figure 3:
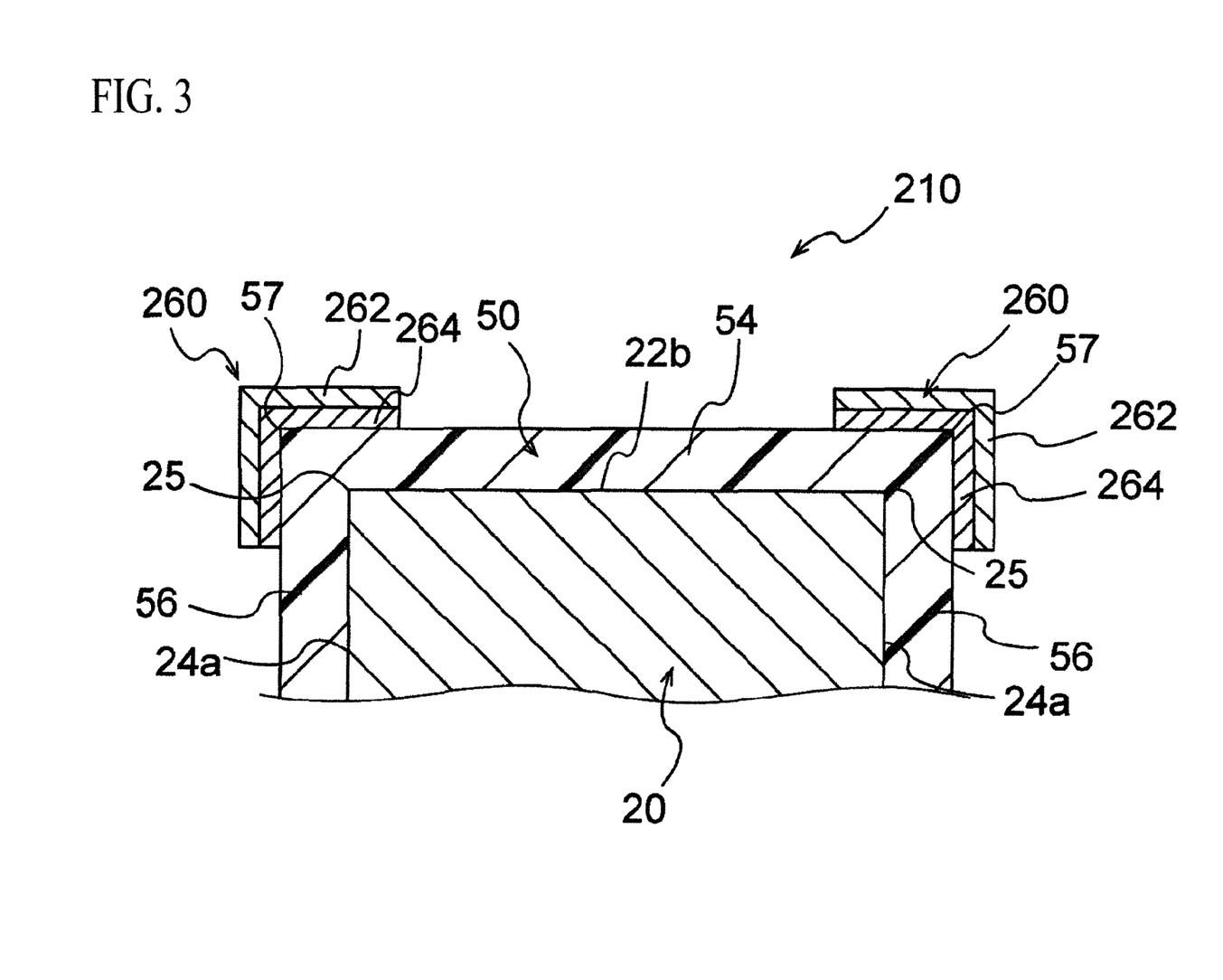
FIG. 3 is a schematic cross-sectional view of an insulating-film-attached metal member according to Second Embodiment.

FIG. 3 is a schematic cross-sectional view of an insulating-film-attached metal member 210 according to Second Embodiment. The insulating-film-attached metal member 210 is similar to the insulating-film-attached metal member 10 shown in FIG. 1 and FIG. 2, except that a reinforcement portion 260 is made of a thin metal film including a plurality of layers. The insulating-film-attached metal member 210 is mainly described for the differences from the insulating-film-attached metal member 10. The common respects with the insulating-film-attached metal member 10 are provided with common reference numerals and are not described.

As shown in FIG. 3, similarly to the reinforcement portion 60 shown in FIG. 1, the reinforcement portion 260 of the insulating-film-attached metal member 210 is made of a metal thin film formed along the insulating-film periphery 57. The metal thin film constituting the reinforcement portion 260 includes a plurality of layers containing different elements or having different composition proportions of contained elements.

As shown in FIG. 3, the reinforcement portion 260 includes an Au layer 262 containing Au and a Pt layer 264 containing Pt. The Au layer 262 constitutes an upper layer of the reinforcement portion 260, and the Pt layer 264 constitutes a lower layer of the reinforcement portion 260.

The Au layer 262 containing Au may contain elements other than Au, but has at least the highest ratio of Au based on the weight ratio of elements contained in the Au layer 262. The Au layer 262 is less likely to have cracking due to its high ductility and can effectively prevent the generation of peeling and cracking at the insulating-film periphery 57 under the reinforcement portion 260. Moreover, since the Au layer 262 has an excellent weather resistance, when the upper layer of the reinforcement portion 260 is the Au layer 262, the aging of the reinforcement portion 260 is prevented, and this contributes to improvement in the durability of the insulating-film-attached metal member 210. Moreover, since the stress of the Au layer 262 is small, a peeling due to stress is less likely to occur in the film and layer (the Pt layer 264 in the reinforcement portion 260) contacted with the Au layer 262.

The Au layer 262 can be formed on the Pt layer 264 by, for example, a thin film formation method, such as sputtering and vapor deposition. For example, the Au layer 262 can have a thickness of 50 to 500 nm and preferably has a thickness of 100 to 250 nm. If the thickness of the Au layer 262 is smaller than a predetermined value, it is difficult for the Au layer 262 to form a continuous film, and the function of the Au layer 262 is deteriorated. On the other hand, if the thickness of the Au layer 262 is larger than a predetermined value, there are disadvantages, such as a decrease in throughput due to an increase in film formation time and an increase in raw material costs.

The Pt layer 264 containing Pt may contain elements other than Pt, but has at least the highest ratio of Pt based on the weight ratio of elements contained in the Pt layer 264. The Pt layer 264 is contacted with the insulating film 50 (lower layer) and the Au layer 262 (upper layer). The Pt layer 264 favorably functions as a diffusion prevention layer. That is, the Pt layer 264 can effectively prevent the elements contained in the layer or film in contact on the lower side from moving (diffusing) to the Au layer 262 in contact on the upper layer. As a result, the Pt layer 264 can prevent problems, such as surface deposition of elements in the lower layer due to heat in the Au layer 262 (upper layer), and maintain the thermal stability of the Au layer 262.

The Pt layer 264 can be formed on the insulating film 50 by, for example, a thin film formation method, such as sputtering and vapor deposition. For example, the Pt layer 264 can have a thickness of 1 to 500 nm and preferably has a thickness of 5 to 50 nm. If the thickness of the Pt layer 264 is smaller than a predetermined value, it is difficult for the Pt layer 264 to form a continuous film, and the diffusion prevention function of the Pt layer 264 is deteriorated. On the other hand, if the thickness of the Pt layer 264 is larger than a predetermined value, there are disadvantages, such as a decrease in throughput due to an increase in film formation time and an increase in possibility of film peeling due to stress.

In the insulating-film-attached metal member 210 shown in FIG. 3, since the reinforcement portion 260 is made of a metal thin film including the Au layer 262 and the Pt layer 264, the reinforcement portion 260 can favorably prevent the occurrence of cracking and peeling in the insulating-film periphery 57 for a longer period of time. As for common respects with the insulating-film-attached metal member 10 shown in FIG. 1 and FIG. 2, the insulating-film-attached metal member 210 exhibits effects similar to those of the insulating-film-attached metal member 10.

Third Embodiment

Figure 4:
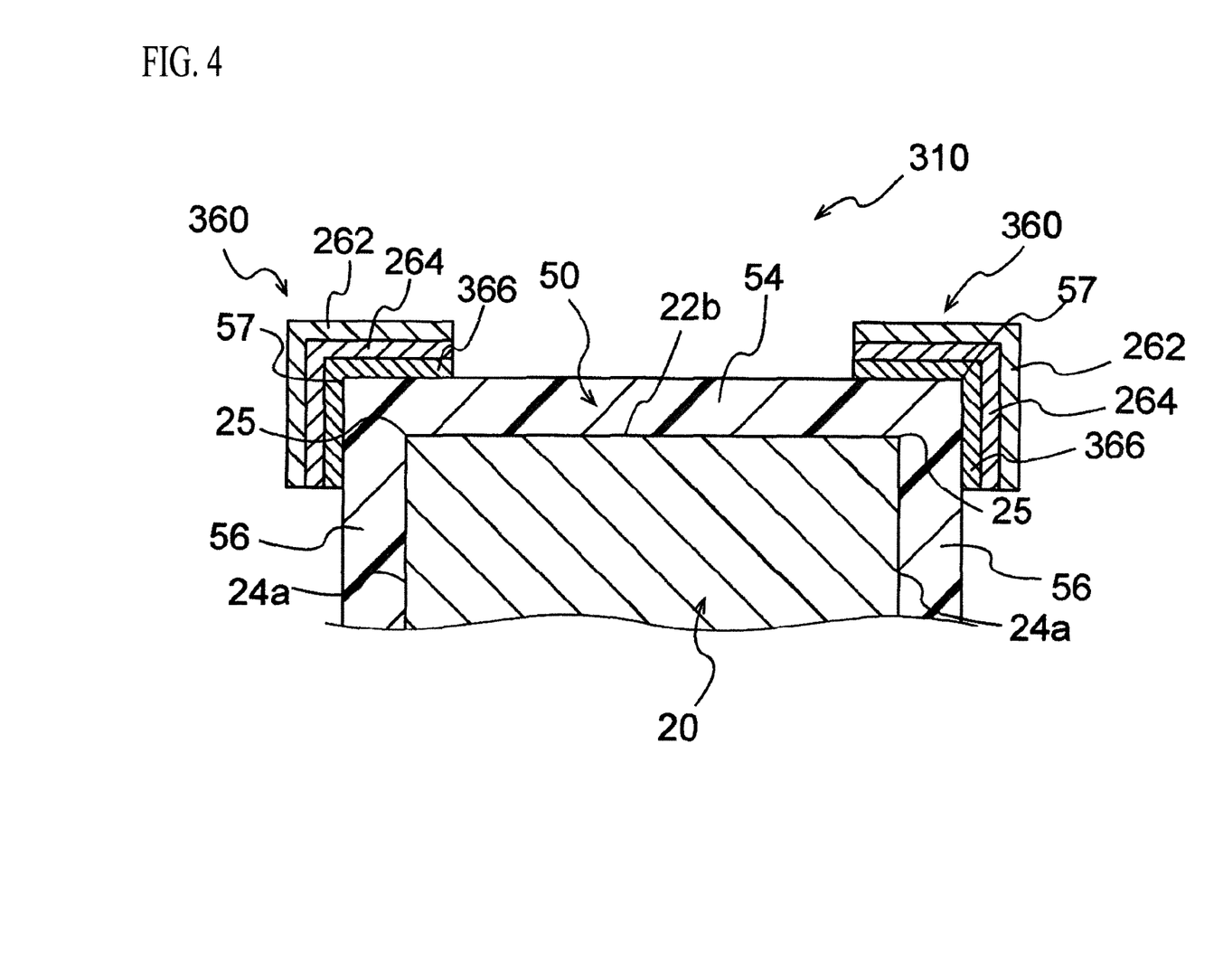
FIG. 4 is a schematic cross-sectional view of an insulating-film-attached metal member according to Third Embodiment.

FIG. 4 is a schematic cross-sectional view of an insulating-film-attached metal member 310 according to Third Embodiment. The insulating-film-attached metal member 310 is similar to the insulating-film-attached metal member 210 shown in FIG. 3, except that a metal thin film constituting a reinforcement portion 360 includes an adhesive layer 366 in addition to the Au layer 262 and the Pt layer 264. The insulating-film-attached metal member 310 is mainly described for the differences from the insulating-film-attached metal member 210. The common respects with the insulating-film-attached metal member 210 are provided with common reference numerals and are not described.

As shown in FIG. 4, the reinforcement portion 360 of the insulating-film-attached metal member 310 is made of a metal thin film including a plurality of layers (three layers in the embodiment) of the Au layer 262, the Pt layer 264, and an adhesive layer 366. The reinforcement portion 360 is formed by stacking the adhesive layer 366, the Pt layer 264, and the Au layer 262 in this order from the side closer to the insulating film 50, and the adhesive layer 366 is the lowest layer in the reinforcement portion 360.

The adhesive layer 366 is contacted with the insulating film 50 and has an adhesion to the insulating film 50 being higher than that of the Au layer 262 and the Pt layer 264, which are the other layers included in the reinforcement portion 360. Examples of metal elements contained in the adhesive layer 366 include Cr, Ti, Ni, and Mo. Comparing with metal elements such as Au and Pt, since Cr, Ti, Ni, Mo, and the like have a property of being more easily combined with other elements, the adhesive layer 366 containing these metal elements has a high adhesion to the insulating film 50 containing Si etc. Moreover, since Ti has a property of being difficult to diffuse into Au and is unlikely to precipitate on the surface of the Au layer 262, Ti is preferable as an element constituting the adhesive layer 366.

The adhesive layer 366 can be formed on the insulating film 50 by, for example, a thin film formation method, such as sputtering and vapor deposition. The adhesive layer 366 can have a thickness of, for example, 1 to 50 nm and preferably has a thickness of 5 to 20 nm. If the thickness of the adhesive layer 366 is smaller than a predetermined value, it is difficult for the adhesive layer 366 to form a continuous film, and the function of increasing adhesion is lowered. On the other hand, if the thickness of the adhesive layer 366 is larger than a predetermined value, there are disadvantages, such as a decrease in throughput due to an increase in film formation time and an increase in possibility of film peeling due to stress.

In the insulating-film-attached metal member 310 shown in FIG. 4, since the reinforcement portion 360 includes the adhesive layer 366 contacted with the insulating film 50, the adhesion between the reinforcement portion 360 and the insulating film 50 is improved, and it is possible to more effectively prevent the occurrence of cracking and peeling the insulating-film periphery 57. As for common respects with the insulating-film-attached metal member 210 shown in FIG. 3, the insulating-film-attached metal member 310 exhibits effects similar to those of the insulating-film-attached metal member 210.

Fourth Embodiment

Figure 5:
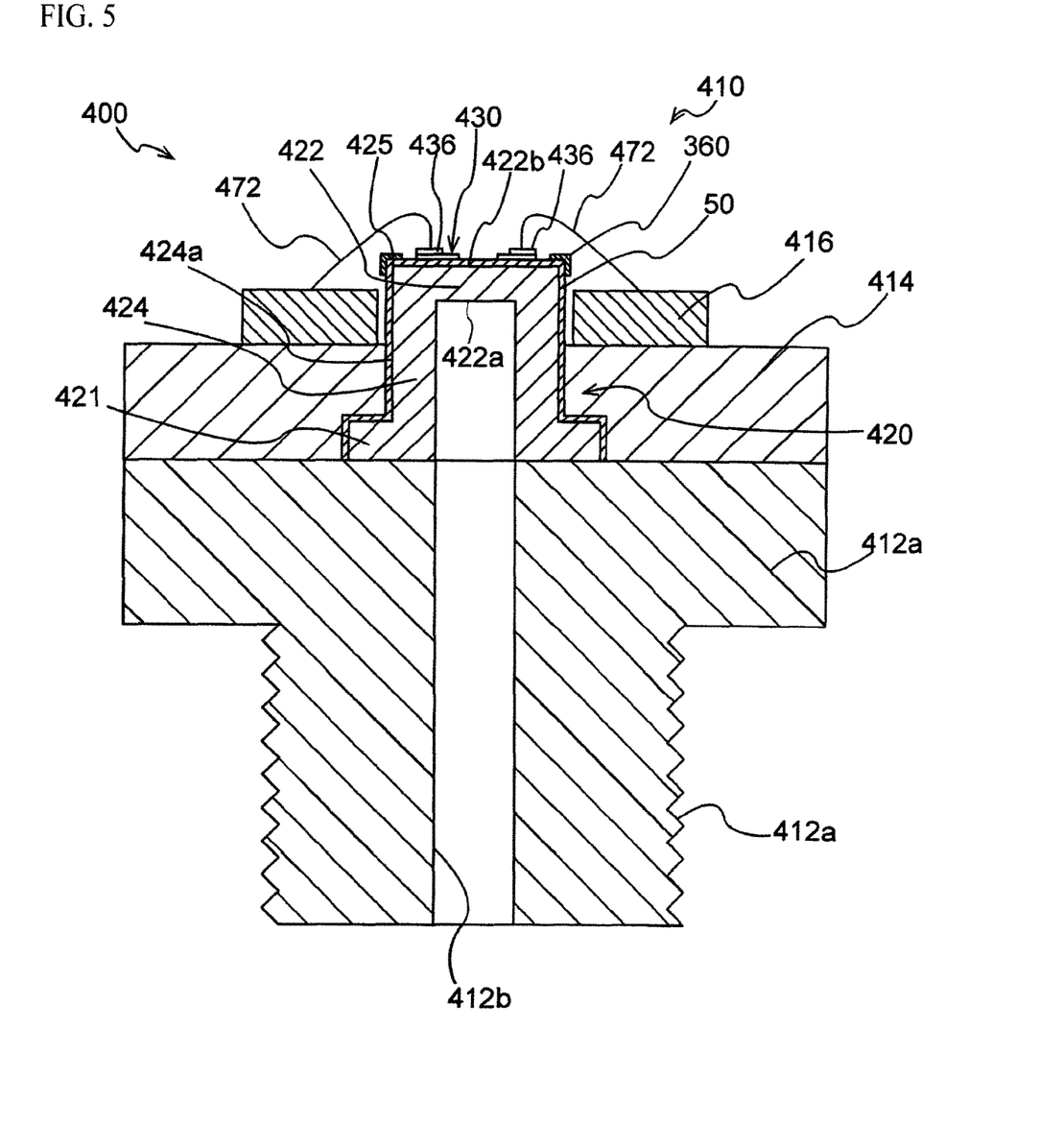
FIG. 5 is a schematic cross-sectional view of a pressure sensor according to Fourth Embodiment.

FIG. 5 is a schematic cross-sectional view of a pressure sensor 400 using an insulating-film-attached metal member 410 according to Fourth Embodiment. Hereinafter, the pressure sensor 400 and the insulating-film-attached metal member 410 are described using FIG. 5 to FIG. 7. The insulating-film-attached metal member 410 is similar to the insulating-film-attached metal member 310 according to Third Embodiment, except that a metal member constituting the insulating film 50 is a metal stem 420. The insulating-film-attached metal member 410 according to Fourth Embodiment is mainly described for the differences from the insulating-film-attached metal member 310 shown in FIG. 4. The common respects with the insulating-film-attached metal member 310 are provided with common reference numerals and are not described.

As shown in FIG. 5, the pressure sensor 400 includes the insulating-film-attached metal member 410 with a metal stem 420 as a metal member, a detection unit 430 for detecting the amount of deformation due to the pressure of a membrane 422 in the metal stem 420, electrode films 436 (see FIG. 6) connected with an intermediate wiring 472 as a wiring unit, and the like.

As shown in FIG. 5, the metal member of the pressure sensor 400 has a stem shape including the membrane 422 with a film formation surface 422b and a connection surface 424a connected to the membrane 422. That is, the membrane 422 constitutes an end wall formed at one end of the hollow cylindrical metal stem 420, and the outer surface of the membrane 422 serves as the film formation surface 422b. In the metal stem 420, an outer surface of a tubular side wall portion 424 connected to the membrane 422 constitutes the connection surface 424a connected to the film formation surface 422b. The film formation surface 422b faces upward, and the connection surface 424a faces sideways. Thus, the surface orientation changes by approximately 90 degrees at a connection position 425 between the film formation surface 422b and the connection surface 424a. The other end of the metal stem 420 is an open end of a hollow portion, and the hollow portion of the metal stem 420 communicates with a flow path 412b of the connection member 412.

In the pressure sensor 400, a fluid introduced into the flow path 412b is guided from the hollow portion of the metal stem 420 to an inner surface 422a of the membrane 422, and a fluid pressure acts on the membrane 422. As with the metal member 20 shown in FIG. 1, the metal stem 420 is made of a metal, such as stainless steel.

A flange portion 421 is formed around the open end of the metal stem 420 so as to protrude outward from the core axis of the metal stem 420. The flange portion 421 is interposed between the connection member 412 and a holding member 414 so as to seal the flow path 412b leading to the inner surface 422a of the membrane 422.

The connection member 412 includes a screw groove 412a for fixing the pressure sensor 400. The pressure sensor 400 is fixed via the screw groove 412a to a pressure chamber or the like in which a fluid to be measured is enclosed. As a result, the flow path 412b formed inside the connection member 412 and the inner surface 422a of the membrane 422 of the metal stem 420 are airtightly communicated with a pressure chamber containing a fluid to be measured.

A circuit board 416 is attached to the upper surface of the holding member 414. The circuit board 416 has a ring shape surrounding the metal stem 420, but the shape of the circuit board 416 is not limited to this. The circuit board 416 incorporates, for example, a circuit to which a detection signal from the detection unit 430 is transmitted.

As shown in FIG. 5, the detection unit 430 is provided on the film formation surface 422b, which is the outer surface of the membrane 422, via the insulating film 50. The detection unit 430 and the circuit board 416 are connected by an intermediate wiring 472 or the like by wire bonding or the like, and an electrical conduction of the detection unit 430 to the outside is ensured by the intermediate wiring 472.

Figure 6:
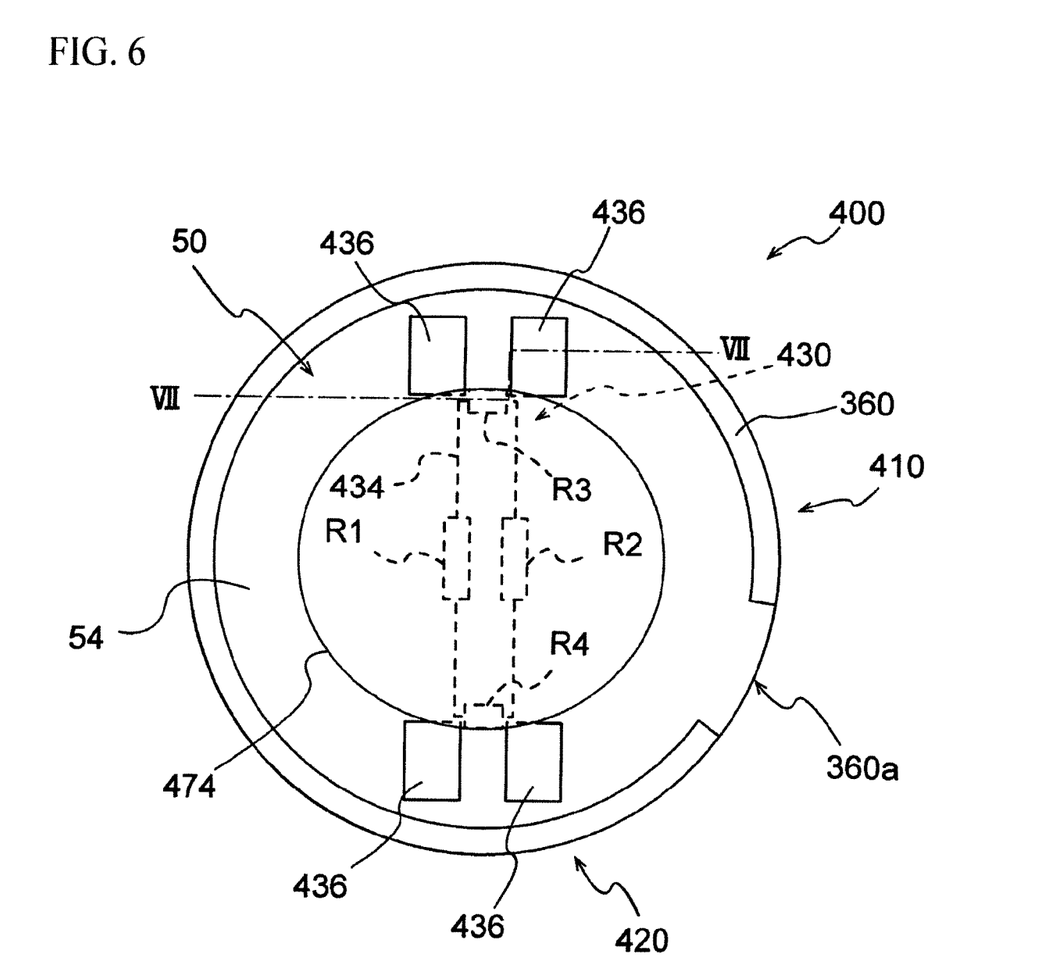
FIG. 6 is a top view of an insulating-film-attached metal member included in the pressure sensor shown in FIG. 5.
Figure 7:
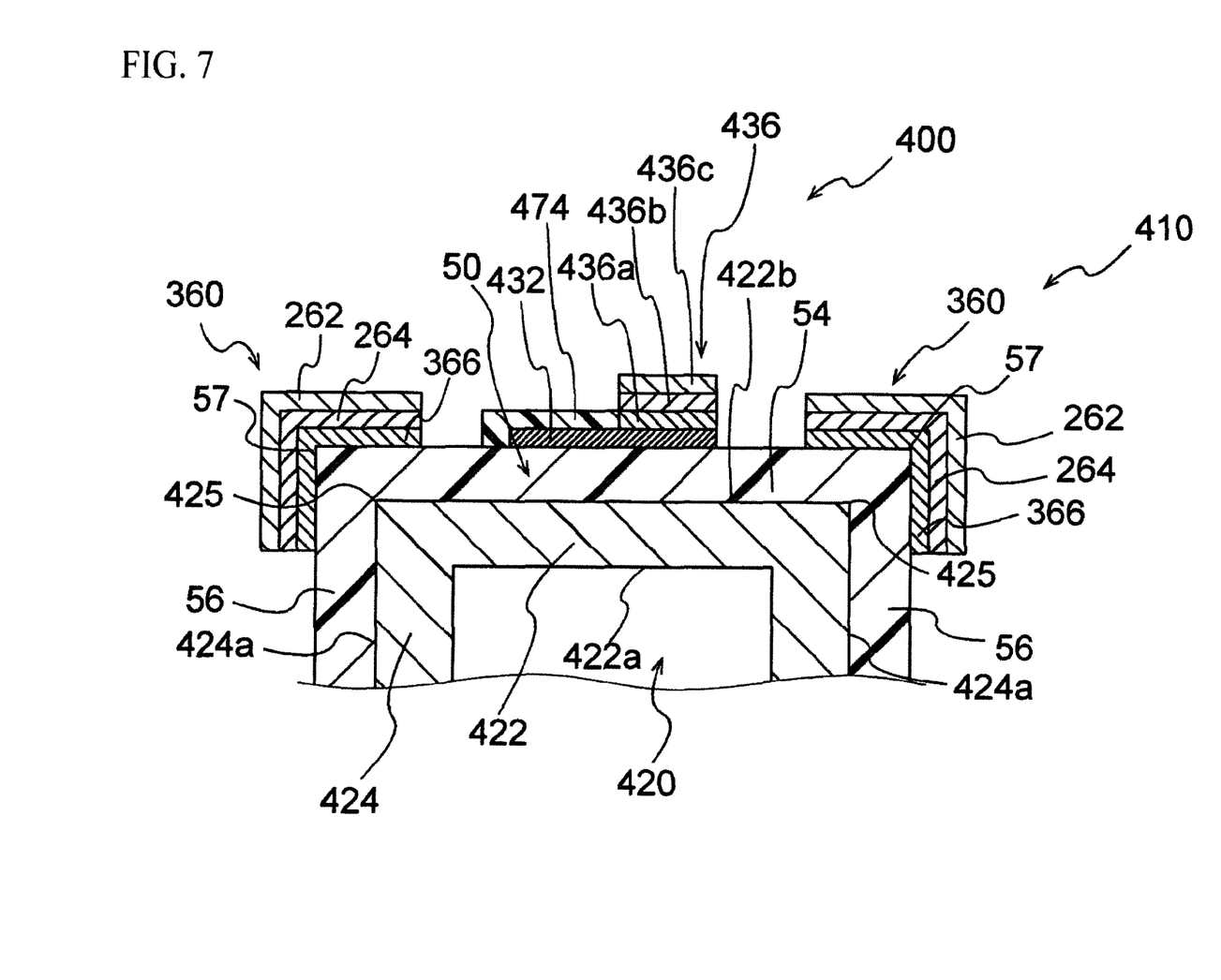
FIG. 7 is a schematic cross-sectional view illustrating an insulating-film-attached metal member and its vicinity in the pressure sensor shown in FIG. 5.

FIG. 6 is a top view of the pressure sensor 400 shown in FIG. 5 viewed from above the film formation surface 422b of the membrane 422. FIG. 7 is a cross-sectional view of the pressure sensor 400 shown in FIG. 6 along the cross-sectional line VII-VII. However, FIG. 6 and FIG. 7 do not illustrate the flange portion 421 of the metal stem 420, the circuit board 416, the intermediate wiring 472, and the like. As shown in FIG. 6 and FIG. 7, the detection unit 430 is formed in the insulating film first portion 54 of the insulating-film-attached metal member 410.

As shown in FIG. 5 and FIG. 6, the detection unit 430 is formed on the upper side of the film formation surface 422b of the metal stem 420 and on the opposite side of the insulating film 50 to a surface thereof facing the film formation surface 422b. As shown in FIG. 6, the detection unit 430 includes resistances R1, R2, R3, and R4 connected by an electrical wiring 434. The electrical wiring 434 and the resistances R1 to R4 of the detection unit 430 are made of a strain resistance film 432.

As with the detection unit 430, the electrode films 436 are formed above the insulating film first portion 54. The electrode film 436 is formed so as to overlap with a part (e.g., the strain resistance film 432) of the detection unit 430 from above and is electrically and physically connected to the detection unit 430. The intermediate wiring 472 shown in FIG. 1 is connected to the electrode films 436. A detection signal of the detection unit 430 is transmitted to the circuit board 416 via the electrode films 436 and the intermediate wiring 472.

The resistances R1 to R4 of the detection unit 430 are formed at predetermined positions on the membrane 422. A strain occurs according to a deformation of the membrane 422, and the resistance values change. The resistances R1 to R4 are connected by the electrical wiring 434 so as to form a Wheatstone bridge circuit. The detection unit 430 detects a deformation amount of the membrane 422, which is one of physical quantities for the metal stem 420, and detects a pressure of the fluid contacted with the inner surface 422a (see FIG. 5) of the membrane 422.

As shown in FIG. 7, the resistances R1 to R4, the electrode film 436, and the like constituting the detection unit 430 are insulated from the metal stem 420 by the insulating film 50 formed on the film formation surface 422b and the connection surface 424a. As shown in FIG. 6 and FIG. 7, an insulating protection film 474 covering the detection unit 430 from above is formed on the upper side of the insulating film first portion 54. However, at least a part of the electrode film 436 is exposed from the protection film 474. The thickness, material, and formation method of the protection film 474 are not limited, but may be similar to those of the insulating film 50, for example.

The strain resistance film 432 constituting the resistances R1 to R4, the electrical wiring 434, and the like can be produced by, for example, patterning a conductive thin film of a predetermined material. The strain resistance film 432 contains Cr and Al. Preferably, the strain resistance film 432 contains 50 to 99 at % of Cr and 1 to 50 at % of Al. More preferably, the strain resistance film 432 contains 70 to 90 at % of Cr and 5 to 30 at % of Al. Since the strain resistance film 432 contains Cr and Al, temperature coefficient of resistance (TCR) and temperature coefficient of sensitivity (TCS) in a high temperature environment are stabilized, and a pressure detection can be performed accurately. When the amount of Cr and Al is within a predetermined range, it is possible to achieve both a high gauge factor and a favorable temperature stability at a higher level.

The strain resistance film 432 may contain elements other than Cr and Al. For example, the strain resistance film 432 may contain O and N. The O and N contained in the strain resistance film 432 may be those taken thereinto after they are not completely removed from a reaction chamber and remain when forming the strain resistance film 432. The O and N contained in the strain resistance film 432 may be intentionally introduced thereinto by being used as atmosphere gases during film formation or annealing.

As shown in FIG. 7, the electrode film 436 includes a contact layer 436a overlapping with the strain resistance film 432, a diffusion prevention layer 436b overlapping with the contact layer 436a, and a mounting layer 436c overlapping with the diffusion prevention layer 436b. The electrode film 436 has a multilayer film structure consisting of a plurality of layers made of different materials. However, the electrode film 436 is not limited to that with a three-layer structure as shown in FIG. 7 and may have a multilayer structure of one layer, two layers, or four or more layers.

As shown in FIG. 7, the contact layer 436a, which is the lowest layer of the electrode film 436, is directly contacted with the strain resistance film 432. Preferably, the contact layer 436a ensures an ohmic contact with the strain resistance film 432 and improves electrical characteristics of the detection unit 430. The contact layer 436a ensures an adhesion strength between the strain resistance film 432 and the electrode film 436 and prevents peeling defects of the film and layers.

The contact layer 436a can be formed by a thin film formation method, such as sputtering and vapor deposition. The thickness of the contact layer 436a is not limited and is, for example, 1 to 50 nm, preferably 5 to 20 nm. Preferably, the contact layer 436a contains at least one of Cr, Ti, Ni, and Mo. Since these elements easily form alloys with other metals, the contact layer 436a containing such elements secures adhesion strength with the strain resistance film 432 and the diffusion prevention layer 436b and can prevent peeling defects between the film and the layers.

Particularly preferably, the contact layer 436a contains Ti. Ti is difficult to diffuse into the mounting layer 436c containing Au etc. and tends to be less likely to precipitate on the upper surface of the mounting layer 436c. Thus, the electrode film 436 including the contact layer 436a containing Ti exhibits a favorable adhesion to the intermediate wiring 472 even after the electrode film 436 is exposed to a high temperature environment.

Moreover, since Ti is also difficult to diffuse into Cr, Ti constituting the contact layer 436a has a property of being difficult to diffuse into the strain resistance film 432 containing Cr and Al even in a high temperature environment. Thus, since the contact layer 436a contains Ti, the detection unit 430 can prevent the elements in the electrode film 436 from diffusing into the strain resistance film 432 even when used in a high temperature environment and can prevent a performance degradation of the strain resistance film 432 due to composition change.

As shown in FIG. 7, the diffusion prevention layer 436b is disposed between the contact layer 436a and the mounting layer 436c in the electrode film 436 and is vertically interposed by the mounting layer 436c and the contact layer 436a. The diffusion prevention layer 436b prevents the elements contained in the film and layers arranged below the diffusion prevention layer 436b, such as the strain resistance film 432 and the contact layer 436a, from diffusing into the mounting layer 436c disposed above the diffusion prevention layer 436b and from precipitating on the upper surface of the mounting layer 436c.

The diffusion prevention layer 436b can be formed by a thin film formation method, such as sputtering and vapor deposition. The thickness of the diffusion prevention layer 436b is not limited and is, for example, 1 to 500 nm, preferably 5 to 50 nm. If the thickness of the diffusion prevention layer 436b is too small, it is difficult to form a continuous film, and the diffusion prevention function may be weakened. If the thickness of the diffusion prevention layer 436b is too large, there may be a problem of film peeling, or there may be a problem of decrease in productivity (throughput) due to increase in film formation time.

Preferably, from the point of preventing the elements contained in the strain resistance film 432, the contact layer 436a, and the like from diffusing to the upper layer, the diffusion prevention layer 436b contains a transition element belonging to the 5th or 6th period. Specifically, preferably, the diffusion prevention layer 436b contains one or more elements selected from Y, Zr, Nb, Mo, Tc, Ru, Rh, Pd, Ag, La, Ce, Pr, Nd, Pm, Sm, Eu, Gd, Tb, Dy, Ho, Er, Tm, Yb, Lu, Hf, Ta, W, Re, Os, Ir, Pt, and Au.

More preferably, the diffusion prevention layer 436b contains a platinum group element. Specifically, preferably, the diffusion prevention layer 436b contains one or more elements selected from Ru, Rh, Pd, Os, Ir, and Pt. Since platinum group elements have a low reactivity and are chemically stable, the diffusion prevention layer 436b containing the platinum group element exhibits a particularly favorable diffusion prevention effect even in a high temperature environment. In particular, among platinum group elements, Pt has a technical track record of being also used in other electrode fields and has more technological accumulation than other platinum group elements.

As shown in FIG. 2, the mounting layer 436c, which is the uppermost layer of the electrode film 436, is exposed on the upper surface of the electrode film 436. The intermediate wiring 472 made of a fine wire of Au, Al, etc. is bonded to the mounting layer 436c by wire bonding or the like. The pressure sensor 400 using the intermediate wiring 472 made of a fine wire of Au, Al, etc. can be used even in a high temperature environment with the melting point of solder or higher and has a favorable heat resistance. The pressure sensor 400 using the intermediate wiring 472 made of a fine wire of Au can improve the heat resistance more than a pressure sensor using the intermediate wiring 472 made of a fine wire of Al.

The mounting layer 436c can be formed by a thin film formation method, such as sputtering and vapor deposition. The thickness of the mounting layer 436c is not limited and is, for example, 10 to 400 nm, preferably 100 to 300 nm. If the thickness of the mounting layer 436c is too small, it is difficult to form a continuous film, and the adhesion to the intermediate wiring 472 may deteriorate. If the thickness of the mounting layer 436c is too large, there may be a problem of film peeling, or there may be a problem of decrease in productivity (throughput) due to an increase in film formation time.

Preferably, from the point of heat resistance and bondability with the intermediate wiring 472, the mounting layer 436c contains at least any of Au, Al, and Ni. More preferably, from the point of improving heat resistance and further improving compatibility with a high temperature environment, the mounting layer 436c contains Au, which exhibits a low resistance even in a high temperature environment and has a high melting point. When a fine wire of Au is used as the material of the intermediate wiring 472, the mounting layer 436c contains Au, and the materials of both of the intermediate wiring 472 and the mounting layer 436c are thereby Au. As a result, the adhesion of the connection portion between the intermediate wiring 472 and the mounting layer 436c is improved.

As shown in FIG. 6 and FIG. 7, the insulating-film-attached metal member 410 of the pressure sensor 400 includes the reinforcement portion 360 similar to that of the insulating-film-attached metal member 310 shown in FIG. 4. That is, the reinforcement portion 360 is formed along the insulating-film periphery 57 and covers the insulating-film periphery 57 except for a discontinuous portion 360a. The reinforcement portion 360 of the insulating-film-attached metal member 410 is made of a metal thin film including the adhesive layer 366, the Pt layer 264, and the Au layer 262.

As shown in FIG. 6 and FIG. 7, the detection unit 430 and the electrode films 436 arranged on the insulating film first portion 54 are arranged with a predetermined interval from the reinforcement portion 360. Since the detection unit 430 and the electrode films 436 are arranged away from the reinforcement portion 360, the insulation between: the detection unit 430 and the electrode films 436; and the reinforcement portion 360 is ensured.

Preferably, the metal thin film constituting the reinforcement portion 360 shown in FIG. 7 includes a common layer with at least a part of the layers of the electrode film 436. For example, the Au layer 262 of the reinforcement portion 360 and the mounting layer 436c of the electrode film 436 can be a common layer including approximately the same constituent elements containing Au. The Pt layer 264 of the reinforcement portion 360 and the diffusion prevention layer 436b of the electrode film 436 can be a common layer including substantially the same constituent elements containing Pt. The adhesive layer 366 of the reinforcement portion 360 and the contact layer 436a of the electrode film 436 can be a common layer including substantially the same constituent elements containing Ti, etc.

As shown in FIG. 7, when both of the metal thin film constituting the reinforcement portion 360 and the electrode film 436 include a plurality of layers and also include a plurality of common layers, the vertical relation of the common layers is preferably matched between the reinforcement portion 360 and the electrode film 436. The reinforcement portion 360 and the electrode film 436 have a favorable productivity because their common layers can be formed in the same process.

Moreover, the constituent layers of the reinforcement portion 360 and the electrode film 436 may be all common and may have the same vertical relation (lamination order). In such a pressure sensor 400, the reinforcement portion 360 and the electrode film 436 can be formed in the same process. In this case, the metal thin film constituting the reinforcement portion 360 is not limited to the three-layer structure of the Au layer 262, the Pt layer 264, and the adhesive layer 366 and may be any metal lamination film common with the electrode film 436.

As a metal member, the pressure sensor 400 shown in FIG. 7 employs the metal stem 420 with a stem shape including the membrane 422. The metal stem 420 can effectively transmit pressure to the detection unit 430 and can improve the sensitivity of the pressure sensor 400. In the pressure sensor 400, the insulating film 50 is formed on the film formation surface 422b and the connection surface 424a, which are the outer surface of the metal stem 420, and the reinforcement portion 360 is further formed so as to prevent cracking and peeling of the insulating film 50. The pressure sensor 400 can ensure favorable detection accuracy and reliability even in an environment requiring a high durability, such as a high temperature environment and a high pressure environment.

As for the common respects with the insulating-film-attached metal member 310 shown in FIG. 4, the insulating-film-attached metal member 410 included in the pressure sensor 400 exhibits effects similar to those of the insulating-film-attached metal member 310. Needless to say, the present disclosure includes many other embodiments and modifications in addition to the embodiments and examples described above. For example, Fourth Embodiment is described with an example of the pressure sensor 400 in which the detection unit 430 detects a deformation amount of the membrane 422 due to pressure, but the detection unit 430 is not limited to one that detects a deformation amount due to pressure. As a physical quantity sensor including the insulating-film-attached metal member 410 and a detection unit, there is a sensor that detects other physical quantity for a metal member, such as strain, temperature, and vibration, in addition to the pressure sensor 400.

DESCRIPTION OF THE REFERENCE NUMERICAL 10, 110, 210, 310, 410 . . . insulating-film-attached metal member
20 . . . metal member
22b, 422b . . . film formation surface
24a, 424a . . . connection surface
25, 425 . . . connection position
50 . . . insulating film
54 . . . insulating film first portion
56 . . . insulating film second portion
57 . . . insulating-film periphery
60, 160, 260, 360 . . . reinforcement portion
60a, 360a . . . discontinuous portion
262 . . . . Au layer
264 . . . . Pt layer
366 . . . adhesive layer
400 . . . pressure sensor
412 . . . connection member
412a . . . screw groove
412b . . . flow path
414 . . . holding member
416 . . . circuit board
420 . . . metal stem
421 . . . flange portion
422 . . . membrane
424 . . . side wall portion
430 . . . detection unit
432 . . . strain resistance film
R1-R4 . . . resistance
434 . . . electrical wiring
436 . . . electrode film
436a . . . contact layer
436b . . . diffusion prevention layer
436c . . . mounting layer
472 . . . intermediate wiring
474 . . . protection film

What is claimed is:

1. A metal member with insulating film comprising:
a metal member including:
a film formation surface; and
a connection surface facing in a different direction from the film formation surface and connecting to the film formation surface;
an insulating film covering at least a part of the film formation surface and the connection surface over a connection position between the film formation surface and the connection surface; and
a reinforcement portion formed along a periphery of the insulating film at the connection position and covering at least a part of the periphery of the insulating film from an opposite side to the metal member.

2. The metal member with insulating film according to claim 1, wherein the reinforcement portion comprises a metal thin film.

3. The metal member with insulating film according to claim 2, wherein the metal thin film comprises an Au layer containing Au.

4. The metal member with insulating film according to claim 2, wherein the metal thin film comprises a Pt layer containing Pt.

5. The metal member with insulating film according to claim 2, wherein the metal thin film comprises an adhesive layer contacted with the insulating layer and at least one other layer,
wherein the adhesive layer has an adhesion to the insulating layer being higher than that of the at least one other layer.

6. A physical quantity sensor comprising:
the metal member with insulating film according to claim 2;
a detection unit detecting a physical quantity of the metal member, the detection unit being formed on an upper side of the film formation surface, the upper side being the opposite side of the insulating layer to a surface thereof facing the film formation surface; and
an electrode film formed so as to overlap with a part of the detection unit from above and connected with a wiring unit for ensuring electrical conduction to the outside of the detection unit,
wherein the metal thin film of the reinforcement portion comprises a common layer with at least a part of layers of the electrode film.

7. A physical quantity sensor comprising:
the metal member with insulating film according to claim 1; and
a detection unit detecting a physical quantity of the metal member, the detection unit being formed on an upper side of the film formation surface, the upper side being the opposite side of the insulating layer to a surface thereof facing the film formation surface,
wherein
the metal member comprises a stem shape including a membrane with the film formation surface and a side wall portion with the connection surface, and
the detection unit detects a deformation amount of the membrane.

8. A pressure sensor comprising:
the metal member with insulating film according to claim 1; and
a detection unit detecting a physical quantity of the metal member, the detection unit being formed on an upper side of the film formation surface, the upper side being the opposite side of the insulating layer to a surface thereof facing the film formation surface,
wherein
the metal member comprises a stem shape including a membrane with the film formation surface and a side wall portion with the connection surface, and
the detection unit detects a deformation amount of the membrane due to pressure of a fluid in contact with an inner surface of the membrane, the inner surface being an opposite surface of the metal member to the film formation surface.

* * * * *